United States Patent
Sakura (10) Patent No.: US 9,694,542 B2
(45) Date of Patent: Jul. 4, 2017

(54) METHOD AND APPARATUS FOR MOLDING THREE-DIMENSIONAL OBJECT AND MOLDING DATA GENERATION METHOD FOR THREE-DIMENSIONAL OBJECT

(71) Applicant: Shozo Sakura, Kanagawa (JP)

(72) Inventor: Shozo Sakura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 58 days.

(21) Appl. No.: 14/840,669

(22) Filed: Aug. 31, 2015

(65) Prior Publication Data

US 2016/0075084 A1   Mar. 17, 2016

(30) Foreign Application Priority Data

Sep. 12, 2014  (JP) ................... 2014-186072
Jul. 8, 2015    (JP) ................... 2015-137197

(51) Int. Cl.
*B29C 67/00*   (2017.01)
*B33Y 10/00*   (2015.01)

(52) U.S. Cl.
CPC ...... *B29C 67/0081* (2013.01); *B29C 67/0092* (2013.01); *B33Y 10/00* (2014.12)

(58) Field of Classification Search
None
See application file for complete search history.

(56) References Cited

U.S. PATENT DOCUMENTS

| | | | | |
|---|---|---|---|---|
| 2010/0228369 | A1* | 9/2010 | Eggers | G06T 17/10 700/98 |
| 2013/0075957 | A1* | 3/2013 | Swanson | B08B 3/104 264/405 |
| 2013/0234370 | A1* | 9/2013 | Suzuki | B29C 67/0059 264/401 |
| 2013/0244040 | A1* | 9/2013 | Oshima | B29C 67/0074 428/411.1 |
| 2014/0300017 | A1* | 10/2014 | Wighton | B29C 67/0092 264/40.1 |
| 2016/0082666 | A1* | 3/2016 | de Pena | B29C 67/0051 700/98 |

FOREIGN PATENT DOCUMENTS

| | | |
|---|---|---|
| JP | 2005-059324 | 3/2005 |
| JP | 2011-156763 | 8/2011 |

* cited by examiner

*Primary Examiner* — Mary F Theisen
(74) *Attorney, Agent, or Firm* — Cooper & Dunham LLP (57) ABSTRACT

A method for molding a three-dimensional object, includes building up layers formed of bonded powder to form a three-dimensional object; and forming a support below the three-dimensional object. The method is performed by a three-dimensional object molding apparatus that includes a powder lamination molding apparatus to form a three-dimensional object by building up layers formed of bonded powder; and a molding data generator to generate data for each layer of the three-dimensional object that the powder lamination molding apparatus laminates, in which a support is formed below the three-dimensional object.

14 Claims, 8 Drawing Sheets

METHOD AND APPARATUS FOR MOLDING THREE-DIMENSIONAL OBJECT AND MOLDING DATA GENERATION METHOD FOR THREE-DIMENSIONAL OBJECT

CROSS-REFERENCE TO RELATED APPLICATIONS

The present application claims priority pursuant to 35 U.S.C. §119(a) from Japanese patent application numbers 2014-186072 and 2015-137197, filed on Sep. 12, 2014 and Jul. 8, 2015, respectively, the entire disclosure of each of which is incorporated by reference herein.

BACKGROUND

Technical Field

The present invention relates to a method and apparatus for molding a three-dimensional object and a molding data generation method for the three-dimensional object.

Background Art

In conventional three-dimensional object molding apparatuses employing a powder lamination molding method, for example, a metal or non-metal powder layer is formed on a bed, liquid droplets of molding liquid are discharged from a head onto the formed powder layer, and a thin-layer layer in which powder particles are bonded is formed. The powder layer is further formed on the molded layer and the layer is again formed. This process to laminate layers is repeated, thereby forming a three-dimensional object.

To reduce wasted powder, a frame is also formed in a molding box as a part of the three-dimensional object, which is not the body of the three-dimensional object.

SUMMARY

In one embodiment of the disclosure, there is provided an optimal method for molding a three-dimensional object that includes building up layers formed of bonded powder; forming a three-dimensional object; and forming a support below the three-dimensional object.

In another embodiment of the disclosure, the above method is performed by a three-dimensional object molding apparatus that includes a powder lamination molding apparatus to form a three-dimensional object by building up layers formed of bonded powder; and a molding data generator to generate data for each layer of the three-dimensional object that the powder lamination molding apparatus laminates, in which a support is formed below the three-dimensional object.

In further another embodiment of the disclosure, a data generation method for a three-dimensional object is provided, including generating data for molding each layer of a three-dimensional object, in which the three-dimensional object is formed by building up layers formed of bonded powder; and generating data for molding a support below the three-dimensional object, other than the data for molding each layer of the three-dimensional object.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIGS. 13A and 13B are views of the three-dimensional object.

DETAILED DESCRIPTION

First, an example of a powder lamination molding apparatus constructing a three-dimensional molding apparatus according to an embodiment of the present invention will be described with reference to FIGS. 1 and 2.

Figure 1:
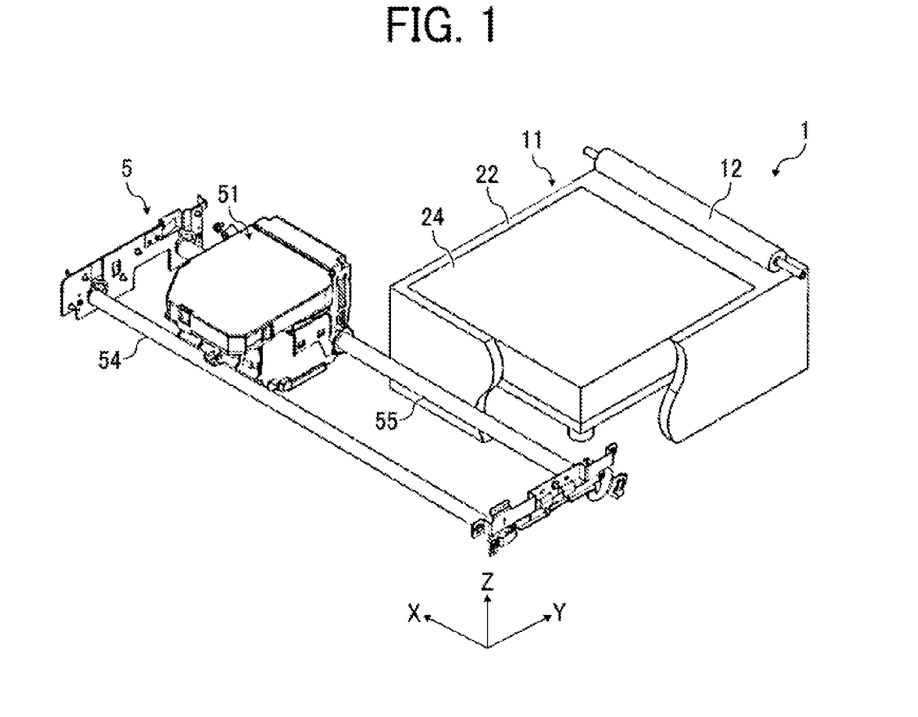
FIG. 1 is a perspective view of principal parts of an example of a powder lamination molding apparatus constructing a three-dimensional molding apparatus according to an embodiment of the present invention.
Figure 2:
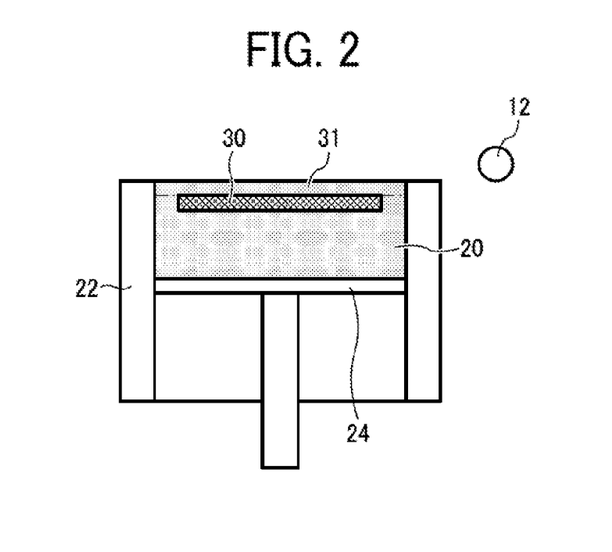
FIG. 2 is a cross-sectional view of a molding part of the powder lamination molding apparatus of FIG. 1.

FIG. 1 is a perspective view of the powder lamination molding apparatus illustrating a principal part thereof, and FIG. 2 is a cross-sectional view of the molding part of the powder lamination molding apparatus of FIG. 1. FIG. 2 illustrates a state in which a layer is formed and a powder layer is further formed on the layer.

The powder lamination molding apparatus includes a molding section 1 in which a layer formed of bonded powder is formed, and a molding unit 5 to discharge liquid droplets of molding liquid and mold a three-dimensional object.

The molding section 1 includes a powder vessel 11 and a flattening roller 12, a rotary member serving as a flattening member, which is called a recoater roller.

The powder vessel 11 includes a molding vessel 22 to which a powder material or simply, a powder 20 is supplied and in which a molding object is formed. A bottom of the molding vessel 22 is a bed or a molding stage 24 and is hoistable vertically. The molding object is formed on the bed 24.

The powder vessel 11 may include a supply vessel to supply the powder to the molding vessel 22, so that the powder vessel 11 together with the molding vessel 22 construct a two vessel structure. In this case, powder is supplied from a powder feeder to the powder vessel 11.

The flattening roller 12 is reciprocally movable relative to the stage surface (i.e., the surface on which powder 20 is stacked) in a direction along the stage surface of the bed 24, and flattens the powder 20 supplied to the molding vessel 22, to thereby form a powder layer 31.

The molding unit 5 includes a discharge head unit 51 including liquid discharge heads that discharge the molding liquid to the powder layer on the bed 24. The molding unit 5 includes a head cleaning unit to clean the discharge head unit 51.

The head cleaning unit includes mainly a cap and a wiper. The cap is caused to press against a nozzle surface on the bottom of the head, and the molding liquid is vacuumed out of the nozzle. Thus, the powder clogged in the nozzle and highly viscose molding liquid can be discharged. Thereafter, the nozzle surface is wiped or cleaned to form a meniscus due to negative pressure. In addition, the head cleaning unit covers a nozzle surface of the head when the molding liquid is not discharged, thereby preventing the powder from entering the nozzle and the molding liquid from drying out.

The molding unit 5 is reciprocally movable in a direction indicated by an arrow Y.

The discharge head unit 51 is so supported by guides 54 and 55 as to reciprocally move in a direction indicated by an arrow X.

The discharge head unit 51 is so supported as to be hoistable in a direction indicated by an arrow Z.

The discharge head unit 51 includes a head to discharge a cyan molding liquid, a head to discharge a magenta molding liquid, a head to discharge a yellow molding liquid, a head to discharge a black molding liquid, and a head to discharge a clear molding liquid.

Figure 3:
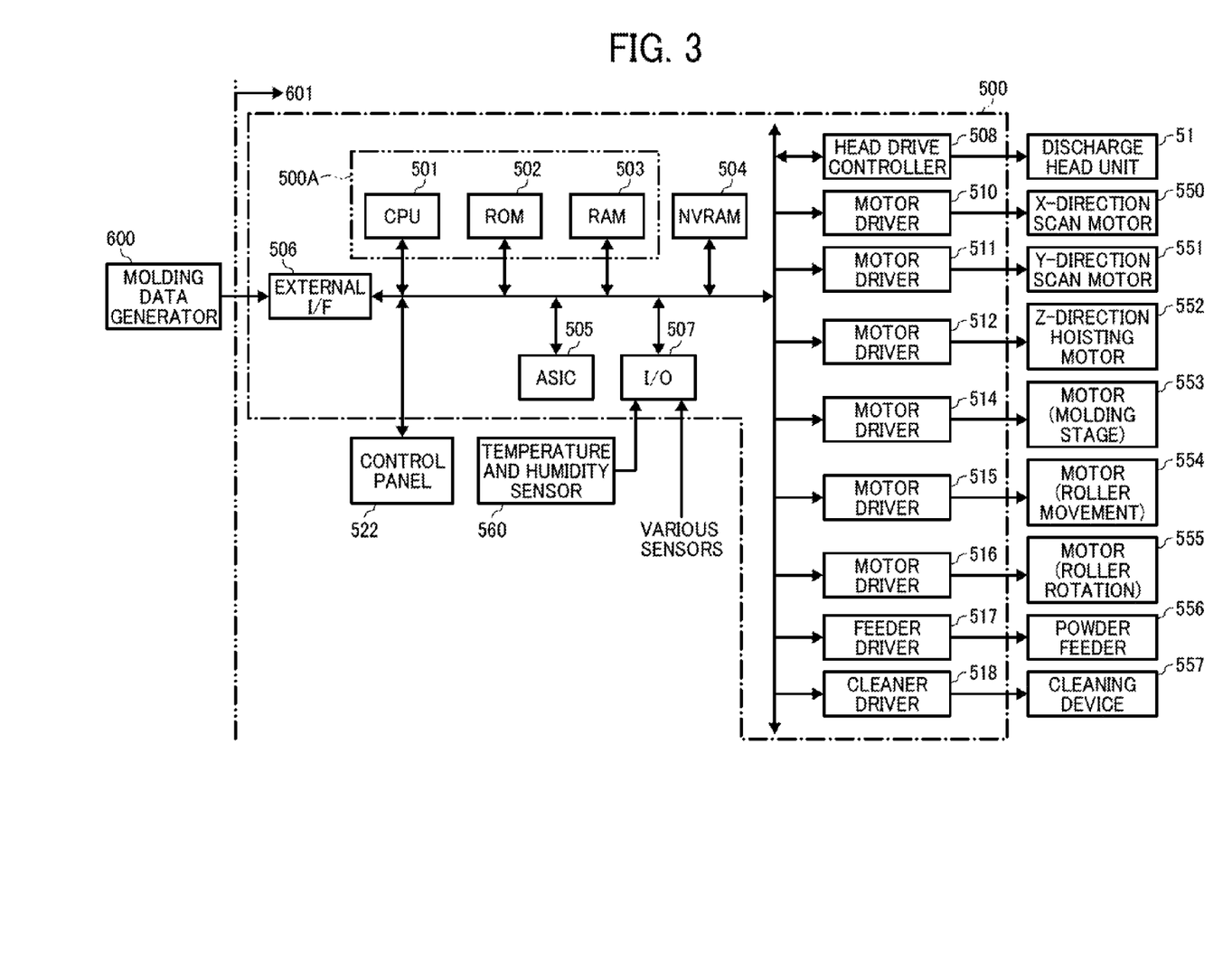
FIG. 3 is a block diagram of a controlling section of a molding data generator and the powder lamination molding apparatus, both of which construct the three-dimensional molding apparatus.

FIG. 3 is a block diagram of a controlling section of a molding data generator and the powder lamination molding apparatus.

The three-dimensional molding apparatus includes the molding data generator 600 and the powder lamination molding apparatus 601.

A control circuit 500 of the powder lamination molding apparatus 601 includes a main controller 500A including: a CPU 501 serving to control the powder lamination molding apparatus entirely; various programs performed by the CPU 501; a read-only memory (ROM) 502 to store programs performed by the CPU 501 and various other fixed data; and a random access memory (RAM) 503 to temporarily store image data or printing data.

The control circuit 500 further includes a nonvolatile memory (NVRAM) 504 to store the data even when power to the apparatus is blocked. In addition, the control circuit 500 further includes an ASIC 505 to perform image processing to handle various signals related to image data and input/output signals to control the apparatus entirely.

The control circuit 500 further includes an interface (I/F) 506 to send and receive data and signals when receiving molding data from the molding data generator 600. Further, the molding data generator 600 generates sliced molding data of a final-form molding object sliced in each layer and is formed of a data processor such as a PC including programs related to the present invention.

The control circuit 500 includes an I/O 507 to retrieve signals detected by various sensors.

The control circuit 500 includes a head drive controller 508 to control driving of each head included in the discharge head unit 51.

The control circuit 500 includes a motor driver 510 to drive an X-direction scan motor 550 that moves the discharge head unit 51 in the X-direction (see FIG. 1), and a motor driver 511 to drive a Y-direction scan motor 551 that moves the molding unit 5 in the Y-direction (see FIG. 1).

The control circuit 500 includes a motor driver 512 to drive a Z-direction hoisting motor 552 that moves the discharge head unit 51 in the Z-direction (see FIG. 1). Hoisting the discharge head unit 51 in the Z-direction may be alternatively configured to hoist the molding unit 5 as a whole.

The control circuit 500 includes a motor driver 514 to drive a motor 553 that hoists the bed 24.

The control circuit 500 further includes a motor driver 515 to drive a motor 554 that moves the flattening roller 12, and a motor driver 516 to drive a motor 555 that rotatably drives the flattening roller 12.

The control circuit 500 includes a feeder driver 517 to drive a powder feeder 556 that supplies the powder 20 to the molding vessel 22, and a cleaner driver 518 to drive a cleaning device 557 that cleans, maintains, and recovers the discharge head unit 51.

A temperature and humidity sensor 560 detects temperature and humidity as environmental conditions. Those signals detected by the temperature and humidity sensor 560 are input to the I/O 507 of the control circuit 500.

A control panel 522 used to input and display information necessary to the image forming apparatus is connected to the control circuit 500.

Figure 4A:
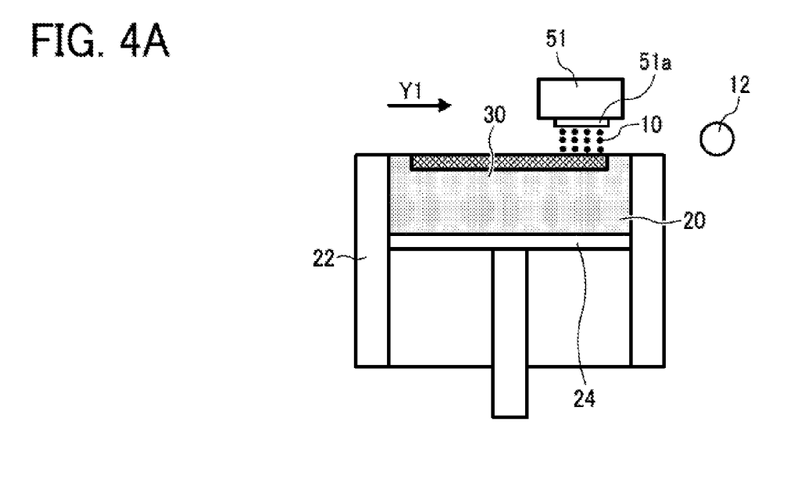
FIGS. 4A and 4B illustrate molding processes performed by the molding section.
Figure 4B:
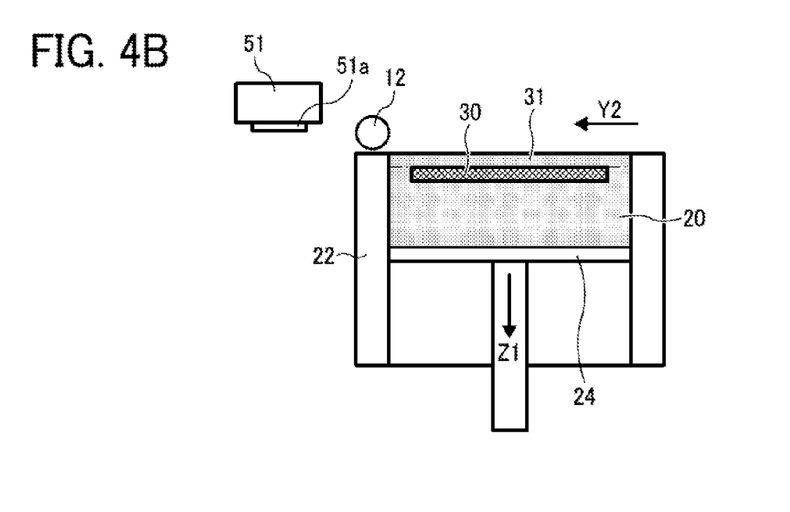

FIGS. 4A and 4B illustrate molding processes performed by the molding section.

As illustrated in FIG. 4A, the discharge head unit 51 includes a head 51a. The powder 20 is supplied on the bed 24 of the molding vessel 22. The molding liquid 10 in the form of liquid droplets is discharged from the head 51a to the powder 20, to thereby form a layer 30.

Thereafter, the bed 24 of the molding vessel 22 is lowered by a depth of one layer in the arrow Z1-direction (see FIG. 4B), so that a next layer 30 is formed on the above layer 30.

Then, as illustrated in FIG. 4B, the powder feeder 556 supplies the powder 20 into the molding vessel 22. The flattening roller 12 is moved in the arrow Y2 direction, while rotating, along the stage surface of the bed 24 of the molding vessel 22, to thereby form a powder layer 31 having a predetermined depth on the layer 30 of the bed 24

Then, liquid droplets of molding liquid 10 are discharged from the head 51a of the discharge head unit 51, to thereby form a next layer 30. The discharge head unit 51 is moved to scan in the arrow X-direction to discharge droplets by an amount of one scan, and the discharge head unit 51 is moved by one scan length in the arrow Y1 direction, and is moved to the arrow X-direction, to thereby discharge liquid droplets by one scan amount.

As described above, formation of the powder layer 31 and solidification of the powder 20 by discharging the molding liquid 10 are repeatedly performed, so that multiple layers 30 are built up, to thereby form a three-dimensional object.

The powder for molding the three-dimensional object includes a base material, and a water-soluble organic material that coats the base material with an average thickness of from 5 nm to 500 nm, and dissolves in, and cross-linkable with, water including a cross-linking agent as a molding liquid.

In this powder for molding the three-dimensional object, the water-soluble organic material that coats the base material is dissolved under the effect of the water including a cross-linking agent and is cross-linkable. Therefore, if the water including a cross-linking agent is added to the water-soluble organic material, the water-soluble organic material is dissolved and is cross-linked under the effect of cross-linking agent included in the water including a cross-linking agent.

Using the powder for molding the three-dimensional object, a thin layer or powder layer is formed, and the water including a cross-linking agent as the molding liquid 10 is discharged to the powder layer. As a result, the dissolved water-soluble organic material is cross-linked in the powder layer, so that the powder layer is bonded and cured, to thereby form a layer 30.

In the conventional apparatus, when the droplets of molding liquid are discharged onto the powder layer as a thin powder layer, which is solidified to be formed as a layer, strength of the thus-formed three-dimensional object remains weak until moisture has evaporated to a certain degree, so that a thin wall portion tends to collapse. As a result, to remove the molded object from a molding frame while retaining the shape of the three-dimensional object, time is required to wait until the moisture of the three-dimensional object has evaporated and a predetermined strength can be obtained.

However, in the present embodiment, because an amount of coating of the water-soluble organic material to coat the base material is from 5 nm to 500 nm in average thickness, a necessary minimal amount of the water-soluble organic material existing around the base material when the water-soluble organic material is dissolved, is cross-linked and forms a three-dimensional network, so that curing of the powder layer is performed with a high dimensional precision and with an optimal strength.

By repeating this operation, even a complicated three-dimensional object can be formed easily and effectively with high precision, without causing the shape to deform before sintering.

The thus-obtained three-dimensional object includes an optimal hardness, does not lose shape even when handled and even after removing waste powder for molding a three-dimensional object by air blowing process, and can be subjected to sintering thereafter at ease.

The thus-formed three-dimensional object includes the base material with a high filling rate and the water-soluble organic material exists around the base material in a very small amount. Accordingly, when the three-dimensional object is finally obtained after processes such as sintering, no unnecessary void exists in the obtained molded object and the molded object with an excellent appearance can be obtained.

Base Material

Preferred material for the base material is not in particular limited, and may be properly selected as far as the material includes a shape of powder or particles in accordance with its purpose. Exemplary materials include, for example, metals, ceramics, carbon, polymer, wood, biocompatible materials, and the like. From the standpoint to obtain a highly robust three-dimensional object, metals and ceramics are preferable because they are susceptible to final sintering process.

Exemplary metals include preferably stainless steel (SUS), iron, copper, titanium, and silver. The stainless steel (SUS) may include SUS316L.

Exemplary ceramics include metal oxide and specific examples thereof are silica ($SiO_2$), alumina ($Al_2O_3$), zirconia ($ZrO_2$), and titania ($TiO_2$).

Exemplary carbon materials include graphite, graphene, carbon nanotube, carbon nanohorn, fullerene, and the like.

Exemplary polymers include known water-insoluble resins.

Exemplary wood includes wood chip, and cellulose.

Exemplary biocompatible materials may include polylactate and calcium phosphate.

These compounds may be used individually or in combination.

Commercially available powder or particles formed from the above materials may be used as the base material in the embodiment of the present invention. Commercially available products may include SUS316L (PSS316L: trade name produced by Sanyo Special Steel Co., Ltd.), $SiO_2$ (EX-CELICA SE-15: trade name, produced by Tokuyama Corporation), $AlO_2$ (TAIMICRON TM-5D: trade name, produced by Taimei Chemicals Co., Ltd.), and $ZrO_2$ (TZ-B53 produced by Tosoh Corporation).

The base material may be subjected to a known surface improving treatment to improve compatibility with the water-soluble organic material.

Water-Soluble Organic Material

Preferred water-soluble organic material is not in particular limited, and may be properly selected as far as the material is soluble to water and cross-linkable under the effect of cross-linking agent. Namely, no limitation is applied as far as the material is water-soluble, and cross-linkable with the cross-linking agent, and the preferred material may be properly selected in accordance with the purpose.

Herein, the solubility of the water-soluble organic material is determined when one gram of the water-soluble organic material is dissolved in one hundred grams of water at 30° C., it is determined as soluble if more than 90% by mass can be dissolved.

In addition, when measured using 4% by mass (w/w %) solution at 20° C., preferred viscosity of the water-soluble organic material is 40 mPa*s or less, more preferably from 1 to 35 mPa*s, and in particularly preferable from 5 to 30 mPa*s.

As described above, the cross-linking agent containing water is applied to the powder for molding the three-dimensional object and the cured material for sintering formed of powder layers is formed. If the viscosity of the water-soluble organic material exceeds 40 mPa*s, the strength of the cured material of the final three-dimensional object is not sufficient for sintering, thereby causing a problem of deformed shape for later process such as sintering. Further, dimensional precision of the cured material may not be sufficient.

The viscosity of the water-soluble organic material is measured in compliance with the standard JISK7117.

Cross-Linking Agent Containing Water

Preferred cross-linking agent containing water as the molding liquid is not in particular limited, and may be properly selected in accordance with the purpose as far as the cross-linking agent is included in the aqueous medium. The cross-linking agent containing water may include an aqueous medium, a cross-linking agent, and other constituents properly selected in accordance with the necessity.

Other constituents may be properly selected considering various conditions, such as a type of means applying the cross-linking agent containing water, frequency of use, amount, and the like. For example, when the cross-linking agent containing water is applied by the liquid discharge method, the other constituents may be selected considering an adverse effect of clogging of the nozzles of the liquid discharge head.

Preferred aqueous media may include water, alcohol such as ethanol, ether, ketone, and the like, but the water is most preferable. The aqueous medium may include a slight amount of alcohol, for example, as a constituent other than water.

By using the cross-linking agent containing water as a powder for molding the three-dimensional object and as a molding liquid, compared to a case in which binder is discharged from the liquid discharge head to laminate the powder or the base material, clogging of the nozzle decreases and durability of the head is improved.

However, use of the cross-linking agent containing water necessitates evaporation of the moisture content from the three-dimensional object to obtain a desired strength. Without applying the method disclosed in the present embodiment, standby time is required until the removal of the molding objet becomes possible.

A first embodiment according to the present invention will now be described with reference to FIGS. 5 through 7.

Figure 5:
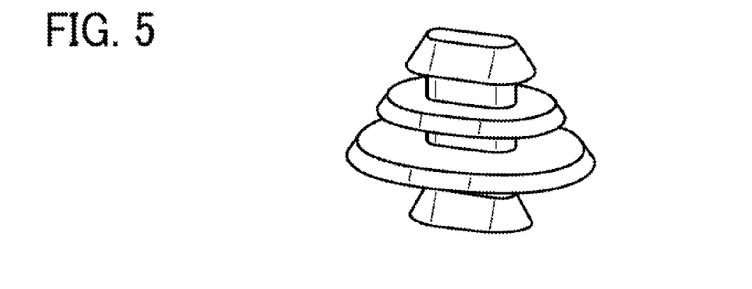
FIG. 5 is a perspective view of an exemplary three-dimensional object according to a first embodiment of the present invention.

FIG. 5 is a perspective view of an exemplary three-dimensional object according to the first embodiment of the present invention; FIG. 6 is a cross-sectional view of a molding vessel after molding has been complete; and FIG. 7 is an explanatory plan view of the three-dimensional object and a support seen from above.

In the present embodiment, before molding the three-dimensional object 100, a plate mold or support 101 is formed below the three-dimensional object 100. The support 101 can be removed together with the three-dimensional object 100, and is separable from the three-dimensional object 100. The shape of the support 101 can be a tray.

Between the three-dimensional object 100 and the support 101, unsolidified powder 20 or the powder layer 31 is disposed.

With this structure, the support 101 can be removed together with the three-dimensional object 100, and is easily separable from the three-dimensional object 100.

Figure 7:
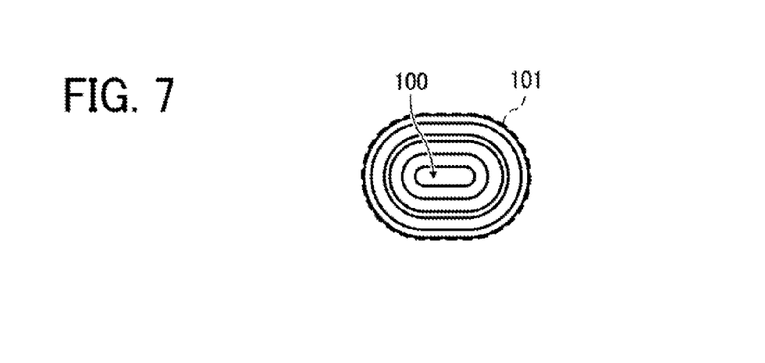
FIG. 7 is an explanatory plan view of the three-dimensional object and a support seen from above.

In this time, the support 101 has the same external shape as that of the three-dimensional object 100 when the three-dimensional object 100 is projected onto the support 101 as illustrated in FIG. 7.

With this structure, the data for the layer of the most external shape of the three-dimensional object 100 can be used as the molding data for the support 101.

When the data for each layer 30 of the three-dimensional object 100 formed by building up the layer 30 in which powder is bonded, is generated by the molding data generator 600, the data for the plate- or tray-shaped support 101 disposed below the three-dimensional object 100 is generated, other than the data for each layer 30 of the three-dimensional object 100. The support 101 is removed together with the three-dimensional object 100 and is separated from the three-dimensional object 100.

Generation of such molding data is performed by a computer via a program causing the computer to generate data for the three-dimensional object to form data for each layer of the three-dimensional object. Similarly, other than the data for each layer of the three-dimensional object, processing to generate the molding data to form the support 101 can be performed by the computer.

Figure 6:
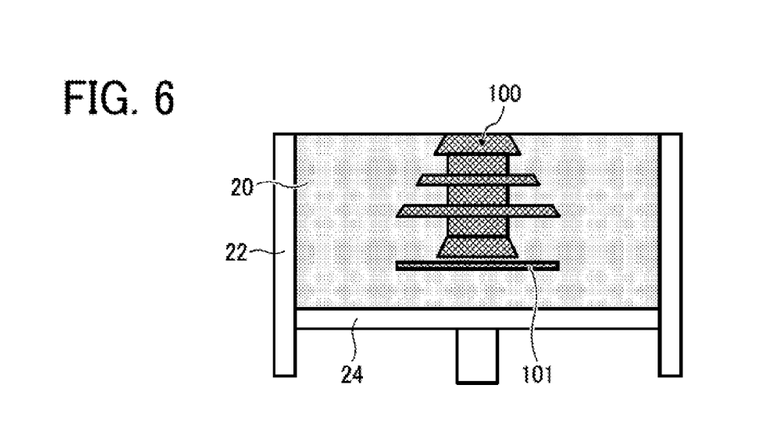
FIG. 6 is a cross-sectional view of a molding vessel after molding has been complete.

The molding data for each layer 30 as well as the support 101 thus generated by the molding data generator 600 is sent to the powder lamination molding apparatus 601, so that, as illustrated in FIG. 6, the support 101 is first molded before the three-dimensional object 100 has been molded on the bed 24 of the molding vessel 22, and thereafter, the three-dimensional object 100 is molded via the unsolidified powder 20 or the powder layer 31.

Figure 8:
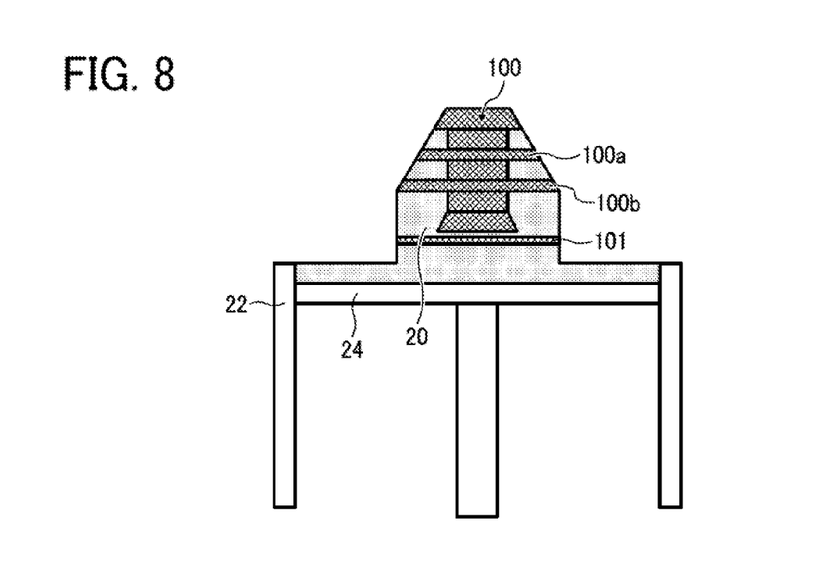
FIG. 8 is a schematic cross-sectional view of the molding vessel when the three-dimensional object is ready for removal from the molding vessel according to the present embodiment.

Next, operation and effect of the present embodiment will be described with reference to FIGS. 8 and 9. FIG. 8 is a schematic cross-sectional view of the molding vessel when the three-dimensional object is ready for removal from the molding vessel, and FIGS. 9A and 9B are respectively a front view and a side view of the three-dimensional object when removed from the molding vessel.

When the three-dimensional object 100 is removed after the molding has been complete, the bed 24 is lifted up to a position where the bottom of the support 101 can be removed, and an excess part of the powder 20 is removed.

Figure 9A:
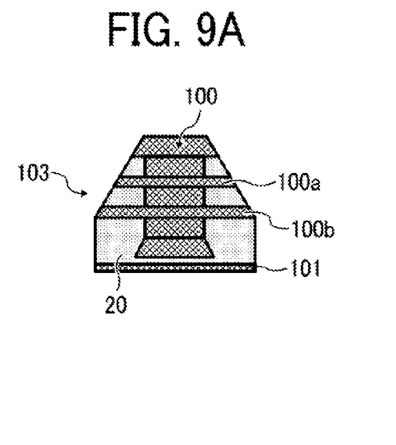
FIGS. 9A and 9B are respectively a front view and a side view of the three-dimensional object when removed from the molding vessel.
Figure 9B:
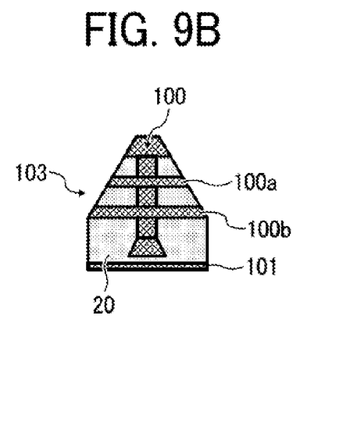

Then, a part above the support 101 is removed from the molding vessel 22, and as illustrated in FIG. 9, a removed molding object 103, that is, the three-dimensional object 100 supported by the support 101 via the powder 20, can be obtained.

In this case, the three-dimensional object 100 as a whole is supported in the vertical direction by the support 101 via an unsolidified powder 20. Accordingly, thin-wall portions 100a, 100b of the three-dimensional object 100 are supported by the support 101 via the powder 20.

The removed molding object 103 won't be broken even though the moisture evaporation is not enough after the three-dimensional object 100 has been molded.

With this structure, the three-dimensional object 100 can be removed from the molding vessel 22 soon after the molding has been complete.

The removed molding object 103 in a state as illustrated in FIG. 9A or 9B is inserted into a drying furnace and is subjected to a post-treatment such as drying.

Thus, the three-dimensional object 100 in a state of the removed molding object 103, in which the three-dimensional object 100 is supported by the support 101 via the powder 20, is removed and dried, thereby reducing useless waste of the powder 20.

When the three-dimensional object 100 together with the molding vessel 22 is inserted into the drying furnace, because the moisture evaporation of the three-dimensional object 100 is not enough, the powder 20 included in the portion other than the three-dimensional object 100 needs to be dried at the same time, resulting in an increase of the waste amount of the powder 20 of which reuse is difficult.

By contrast, when the removed molding object 103 is removed and dried, the amount of the powder 20 disposed at a portion other than the three-dimensional object 100 is small, thereby reducing the waste powder amount.

Unsolidified powder 20 exists between the three-dimensional object 100 and the support 101 in the removed molding object 103, thereby improving the releasability or separability after drying.

Figure 10:
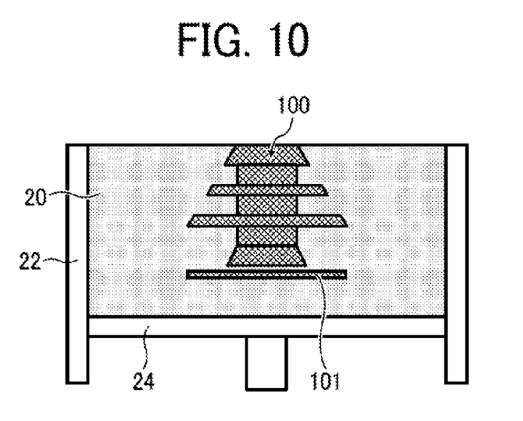
FIG. 10 is a cross-sectional view of the molding vessel after molding has been complete according to a second embodiment of the present invention.

Next, a second embodiment according to the present invention will be described with reference to FIGS. 10 and 11. FIG. 10 is a cross-sectional view of the molding vessel after molding has been complete according to a second embodiment of the present invention, and FIG. 11 is a plan view of the three-dimensional object and the support seen from above according to the second embodiment.

In the present embodiment, before molding the three-dimensional object 100, a plate mold or support 101 is formed below the three-dimensional object 100 with the unsolidified powder 20 or the powder layer 31 in between. The support 101 can be removed together with the three-dimensional object 100, and is separable from the three-dimensional object 100.

Figure 11:
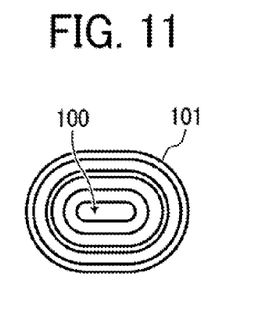
FIG. 11 is a plan view of the three-dimensional object and the support according to the second embodiment.

In this time, the support 101 has an external shape larger than that of the three-dimensional object 100 when the three-dimensional object 100 is projected onto the support 101 as illustrated in FIG. 11.

Similarly to the first embodiment, the molding data generator 600 generates molding data for the support 101 other than the three-dimensional object 100, and the generation of the molding data is performed by the computer via the program installed.

Next, operation and effect of the present embodiment will be described with reference to FIGS. 12 and 13.

Figure 12:
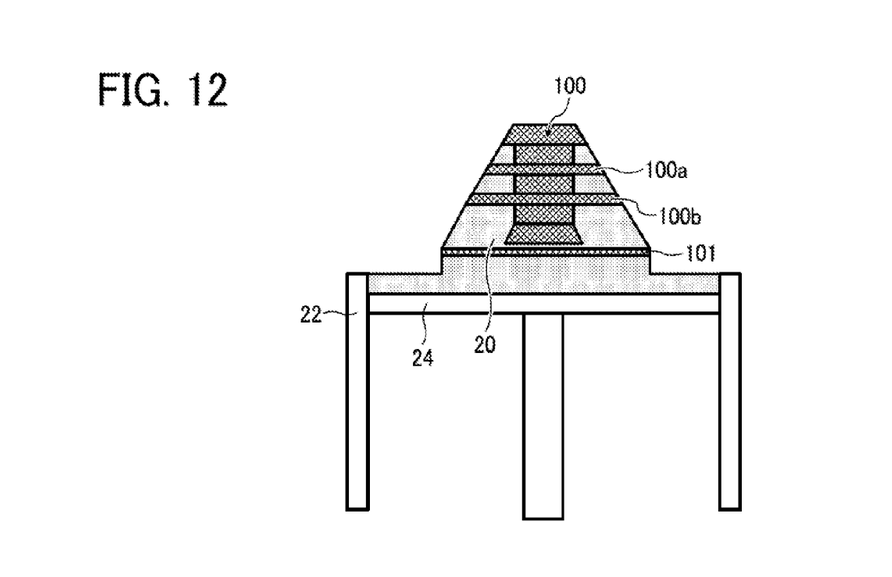
FIG. 12 is a schematic cross-sectional view of the molding vessel when the three-dimensional object is ready for removal from the molding vessel according to the second embodiment.
Figures 13A, 13B:
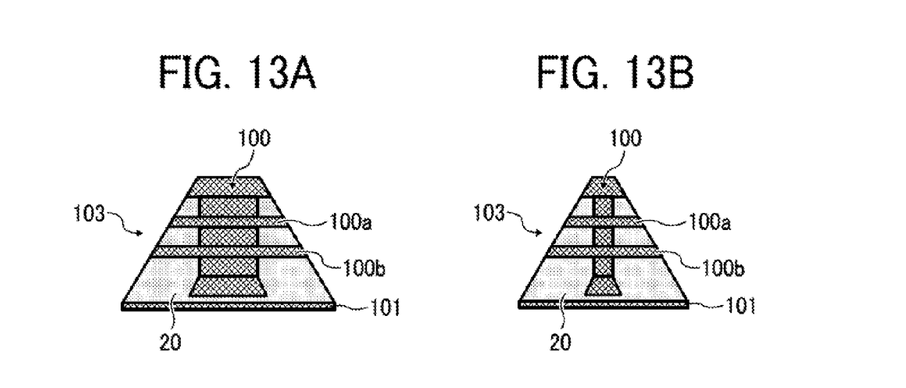
FIG. 13A is a front view and FIG. 13B is a side view.

FIG. 12 is a schematic cross-sectional view of the molding vessel when the three-dimensional object is ready for removal from the molding vessel, and FIGS. 13A and 13B are respectively a front view and a side view of the three-dimensional object when removed from the molding vessel.

When the three-dimensional object 100 is removed after the molding has been complete, the bed 24 is lifted up to a position where the bottom of the support 101 can be removed as illustrated in FIG. 12, and an excess part of the powder 20 is removed.

Then, a part above the support 101 is removed from the molding vessel 22, and as illustrated in FIG. 13, a removed molding object 103, that is, the three-dimensional object 100 supported by the support 101 via the powder 20, can be obtained.

In this time, because the support 101 has an external shape larger than that of the three-dimensional object 100 when the three-dimensional object 100 is projected onto the support 101, the support 101 can more securely support the three-dimensional object 100.

The other effect and performance of the second embodiment is identical to those in the first embodiment.

A third embodiment according to the present invention will now be described with reference to FIGS. 14 and 15.

Figure 14:
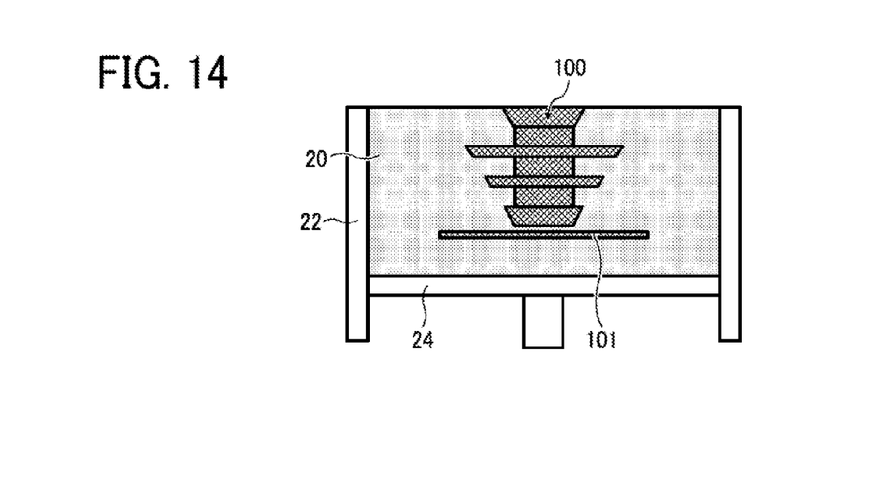
FIG. 14 is a cross-sectional view of the molding vessel after molding has been complete according to a third embodiment of the present invention.
Figure 15:
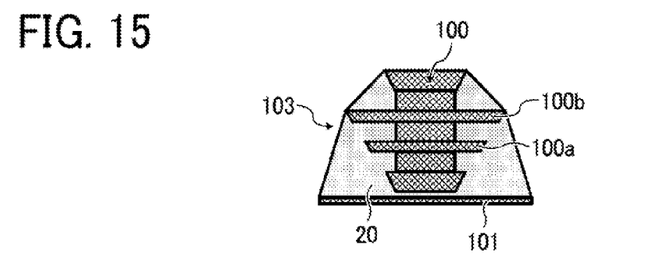
FIG. 15 is a front view of the three-dimensional object when removed from the molding vessel.

FIG. 14 is a cross-sectional view of the molding vessel after molding has been complete according to a third embodiment of the present invention, and FIG. 15 is a front view of the three-dimensional object when removed from the molding vessel.

In the first and second embodiments, the three-dimensional object 100 includes a cross-sectional area in X-Y direction decreasing upward. By contrast, in the present third embodiment, the three-dimensional object 100 includes a cross-sectional area in X-Y direction increasing upward in Z-direction.

Even with this configuration, the same effect as that of the first and second embodiments can be obtained.

Figure 16:
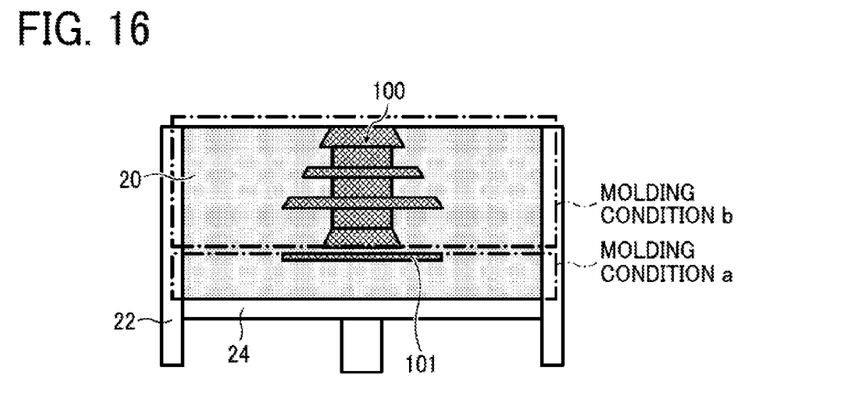
FIG. 16 is a cross-sectional view of the molding vessel after molding has been complete according to a fourth embodiment of the present invention.

FIG. 16 is a cross-sectional view of the molding vessel after molding has been complete according to the fourth embodiment of the present invention.

In the present embodiment, the molding condition "a" in molding the support 101 is different from the molding condition "b" in molding the three-dimensional object 100.

For example, because the support 101 does not require high-precision molding, the molding condition "a", that is, the resolution in the XYZ directions, is lower than the molding condition "b" in molding the three-dimensional object 100.

With this configuration, the time for total molding can be shortened.

In addition, the type of the liquid droplet is different. When the water-soluble organic material is coated on the powder, and the cross-linking agent containing water is used as the molding liquid, the support 101 is molded using an adhesive as liquid droplets (molding condition "a"), but the three-dimensional object 100 is molded using cross-linking agent containing water (molding condition "b").

With this structure, the support 101 that is finally discarded can reinforce immediately after the liquid droplet discharge, the removed molding object 103 exerts an improved stability, and the three-dimensional object 100 can move on to a next process such as degreasing and sintering after drying.

Figure 17:
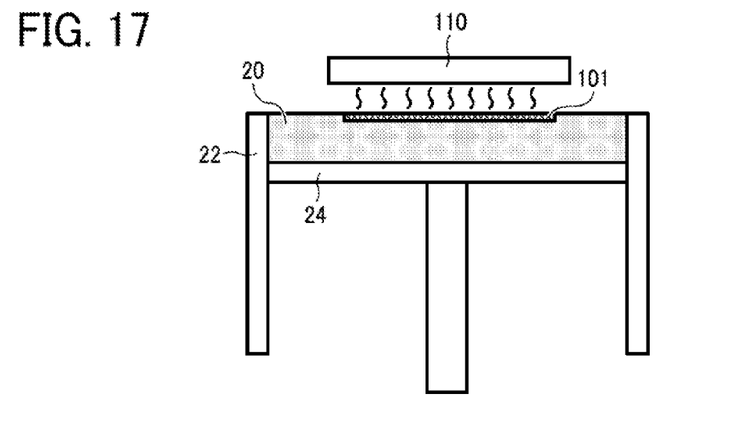
FIG. 17 is a cross-sectional view of the molding vessel after molding has been complete according to a fifth embodiment of the present invention.

FIG. 17 is a cross-sectional view of the molding vessel according to the fifth embodiment of the present invention.

In the present embodiment, the water-soluble organic material is coated on the powder, and the cross-linking agent containing water is used as the molding liquid to form the support 101. Thereafter, the moisture of the support 101 is evaporated by a dryer 110. After the above process, the three-dimensional object 100 is molded. A heater may be used as a dryer 110.

Specifically, because the support 101 is a thin plate, the moisture thereof can be evaporated by heating in a short time and its strength may be increased.

Thus, without using various types of liquid droplets and without an adverse effect on the total molding time, stability of the removed molding object 103 can be improved.

Figure 18:
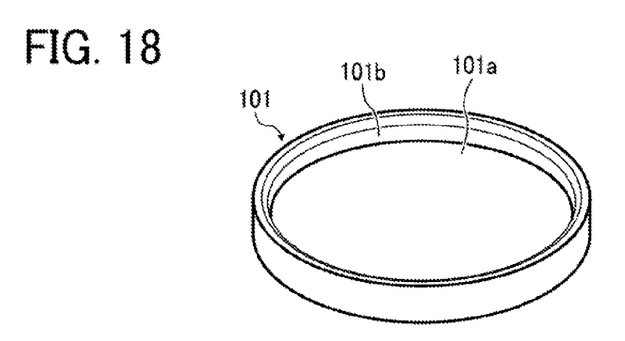
FIG. 18 is a perspective view of a support according to a sixth embodiment of the present invention.
Figure 19:
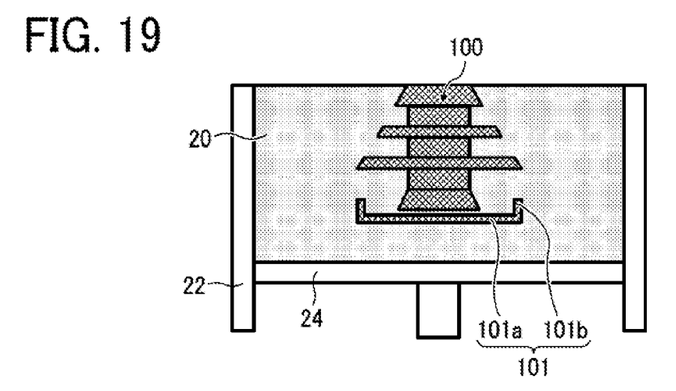
FIG. 19 is a cross-sectional view of a molding vessel after molding has been complete according to the sixth embodiment.

FIG. 18 is a perspective view of a support according to the sixth embodiment of the present invention. FIG. 19 is a cross-sectional view of the molding vessel after molding has been complete, and FIG. 20 is an explanatory view of the three-dimensional object when removed from the molding vessel.

In the present embodiment, before molding the three-dimensional object 100, a plate mold or support 101 is formed below the three-dimensional object 100 as illustrated in FIG. 19. The support 101 can be removed together with the three-dimensional object 100, and is separable from the three-dimensional object 100.

The support 101 includes a rib or standing wall 101b protruding from an external rim of a plate portion 101a, as illustrated in FIG. 18.

Figure 20:
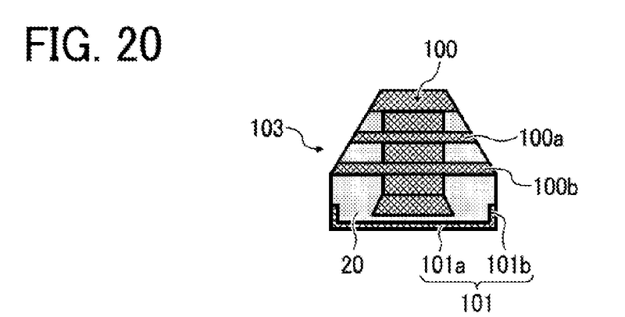
FIG. 20 is an explanatory view of the three-dimensional object when removed from the molding vessel according to the sixth embodiment of the present invention.

As illustrated in FIG. 20, the standing wall 101b of the support 101 as well serves to support the three-dimensional object 100 via the powder 20 when removing the three-dimensional object 100 from the molding vessel 22 and after the removal.

Additional modifications and variations of the present invention are possible in light of the above teachings. It is therefore to be understood that, within the scope of the appended claims, the invention may be practiced other than as specifically described herein.

What is claimed is:

1. A method for molding a three-dimensional object, comprising:
   building up layers formed of bonded powder to form a three-dimensional object;
   forming a support below the three-dimensional object; providing unsolidified powder between the three-dimensional object and the support;
   removing a part above the support as a removed molding object including the three-dimensional object supported by the support via the unsolidified powder; and
   drying the removed molding object including the three-dimensional object supported by the support via the unsolidified powder by a drying furnace.

2. The method as claimed in claim 1, wherein the support has the same external shape as that of the three-dimensional object as projected onto the support.

3. The method as claimed in claim 1, wherein the support has a size larger than that of the three-dimensional object as projected onto the support.

4. The method as claimed in claim 1, wherein the support is molded and dried before forming the layer of the three-dimensional object.

5. The method as claimed in claim 1, wherein the support is a plate.

6. The method as claimed in claim 1, wherein the support is a tray.

7. The method as claimed in claim 1, wherein the support is formed between a molding stage and a bottommost part of the three-dimensional object formed on the molding stage.

8. A method for molding a three-dimensional object, comprising:
   building up layers formed of bonded powder to form a three-dimensional object;
   forming a support below the three-dimensional object; and
   setting a molding condition for molding the support different from a molding condition for molding the three-dimensional object.

9. The method as claimed in claim 8, further comprising:
   discharging liquid droplets of a molding liquid to the powder; and
   forming a layer in which the powder is bonded, while using the liquid droplet for molding the support, other than the liquid droplet for molding the three-dimensional object.

10. The method as claimed in claim 8, wherein the support is a plate.

11. The method as claimed in claim 8, wherein the support is a tray.

12. A method for molding a three-dimensional object, comprising:
    building up layers formed of bonded powder to form a three-dimensional object;
    forming a support below the three-dimensional object;
    providing unsolidified powder between the three-dimensional object and the support; and
    removing a part above the support as a removed molding object including the three-dimensional object supported by the support via the unsolidified powder,
    wherein the support has an external shape equal to or larger than an external shape of the three-dimensional object as projected onto the support, and
    wherein the removed molding object including the three-dimensional object has the unsolidified powder attached around the three-dimensional object within dimensions of the support.

13. The method as claimed in claim 12, wherein the support is a plate.

14. The method as claimed in claim 12, wherein the support is a tray.

* * * * *